(Specimens.)
J. THOMSON.
METHOD OF MANUFACTURING HARD RUBBER ARTICLES.
No. 520,196. Patented May 22, 1894.
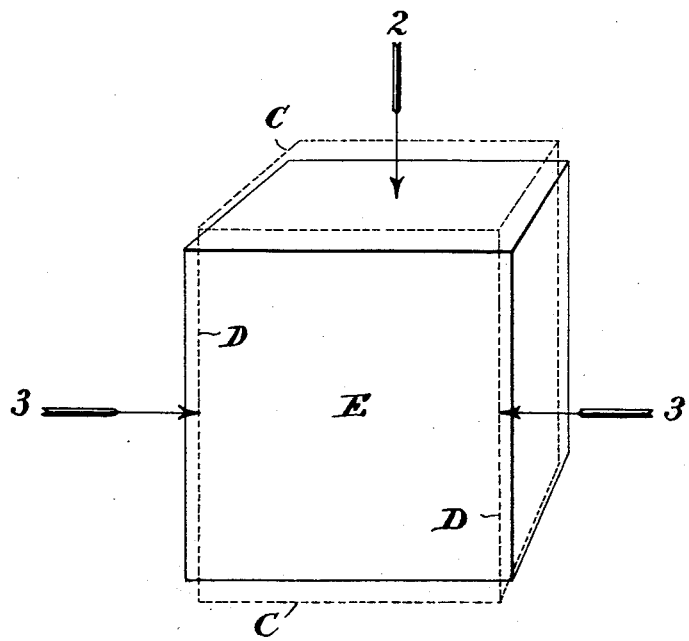
Witnesses
G. P. Kramer.
J. A. Fairgrieve.
Inventor
John Thomson.
by Foster Freeman
Attorneys

UNITED STATES PATENT OFFICE.

JOHN THOMSON, OF BROOKLYN, NEW YORK, ASSIGNOR TO THE NEPTUNE METER COMPANY, OF NEWARK, NEW JERSEY.

METHOD OF MANUFACTURING HARD-RUBBER ARTICLES.

SPECIFICATION forming part of Letters Patent No. 520,196, dated May 22, 1894.

Application filed August 16, 1893. Serial No. 483,282. (Specimens.)

*To all whom it may concern:*

Be it known that I, JOHN THOMSON, a citizen of the United States, residing at Brooklyn, in the county of Kings and State of New York, have invented certain new and useful Improvements in Methods of Manufacturing Hard-Rubber Articles, of which the following is a specification.

My invention relates to improvements in the method of manufacturing hard rubber articles, and to these ends my invention consists in the various features substantially as hereinafter more particularly set forth.

In the accompanying drawing I have shown a conventional figure, simply as an aid in explaining my invention and illustrating the principles upon which it is based.

It is well known in the art that articles formed of hard rubber, when subjected to changes of temperature, atmospheric or otherwise, are liable to become more or less distorted, which, especially in articles which are to be used for mechanical purposes where they are subjected to variations of temperature, is a great disadvantage, causing friction, wear, and perhaps inoperativeness of the parts, and it is one of the objects of my invention to provide a method of manufacture whereby hard rubber articles when once made and fitted for the purposes desired, will retain their form and configuration, even when subjected to the elements, or changes of temperature, or other distributing causes.

It has been observed in the art that hard rubber articles formed by the "blowing" process, that is, by the internal pressure of steam or gas, or articles such as rods and plates, which are vulcanized under little or no external pressure, are subject to much less distortion when subjected to the action of heat, or changes of temperature, than when said articles are vulcanized in dies under powerful pressure, such as hydraulic pressure, which is necessary in making articles for mechanical purposes; but I am not aware that any definite observations have heretofore been made or recorded in respect to the exact action which takes place in a molded hard rubber article when it is subjected to re-heating, or to variations of temperature.

I have demonstrated by practical experiment that when a hard rubber article has been subjected to heat and to heavy pressure in molding, and is again subjected to a moderate increase of temperature, such as boiling water, or otherwise exposed to heat, the article will be found to have expanded in the general direction of the applied pressure, and to have contracted in other directions, and thereby it becomes distorted and often unfit for use. Thus, referring to the drawing, in which is illustrated for example, a cube of hard rubber E, and which has been vulcanized in a metal mold and subjected to pressure to cause the material to conform to the mold, which pressure is applied in the direction of the arrow 2, and maintained generally throughout the period of the vulcanizing process, it will be seen that when said article is again subjected to a moderate increase of temperature, and cooled, the cube will be found to have expanded in the direction of the applied pressure, as is indicated by the dotted lines C, whereas, it will have correspondingly contracted in its vertical sides, as indicated by the arrows 3 and the dotted lines D. In other words, no change will be found in the weight or mass of the cube, although its substance has been subjected to a permanent displacement from the primary position given to it by the die under pressure, and that displacement is, as before indicated, represented by the expansion in the direction of the pressure and contraction in the other directions. The exact reasons for this action need not, and perhaps cannot be fully explained, but it is sufficient to state that practical experiments have demonstrated that this is the general tendency to distortion of the articles, under the circumstances stated.

I have further demonstrated, that if the article which has been first vulcanized and cooled under pressure, is again re-heated and cooled without pressure, and has become distorted under such process, when it is again for the third time subjected to heat at a temperature not greater than the second heating, for instance, it is found that there will be no additional distortion or displacement, and that the material or substance of the article has received a permanent "set" on the second heating, and that any change that may occur during any subsequent heating, will be such a uniform increase or decrease of bulk in all its dimensions, as would take place in a similar article of metal. In other words, that the distortion and displacement of the material of such articles, which takes place at the second reheating, will not take place at any subsequent re-heating, and that, therefore, the articles are in better condition for use for mechanical purposes, in the applied arts.

My invention is based on these demonstrated facts, and I will now describe the method in which I carry out my invention and produce the improved articles, so that others may practice the same.

In molding the desired article, a die of the proper configuration is filled with the crude material and is inserted in a proper press and subjected to heat and pressure in the usual way, until the compound becomes plastic and has assumed the desired form of the article to be produced, all as in the regular practice heretofore carried out. When, however, the plastic material has been forced to flow and take the required form of the mold-cavity, the pressure upon the die is partially, or preferably entirely, removed, the die, however, and the article therein being retained under the action of heat until the vulcanizing process is completed, and then it is cooled while still remaining in the mold. Thus it will be seen that while the rubber compound is primarily forced to assume the form of the cavity in the die, when in its plastic condition, by the pressure applied thereto, it is then released from the extreme extraneous pressure and is, to a greater or less extent, free to resume its natural conditions, as if it were molten metal in a mold, and to be cooled and become "set" under these conditions. The consequence of this simple and improved method of molding hard rubber articles, is that the articles are not liable to distortion or displacement of the material when again subjected to heat, as is usual with such molded articles as heretofore made. Moreover, this method does not materially interfere with the production of accurately molded articles, which may be used for mechanical purposes, and when necessary, as a refinement, the die may be properly proportioned and adapted, so that when the material is under the extreme pressure, it shall be so much less in size than that required in the completed article as the expansion of the article, which takes place when the pressure is removed, is greater than the article under the highest pressure; that is, the die can be of such size and configuration as to allow for the reaction of the material when the pressure is removed, and a product may thus be produced not only of uniform density and accuracy, but which is tougher and stronger than any heretofore manufactured by the usual processes, and which has a physical characteristic of being able to withstand a re-heating without distortion or displacement of the material, so that the article itself is a greatly improved article, and one which can readily be recognized as such.

The importance of this improvement will be readily appreciated by any one using hard rubber articles for mechanical purposes, in that it will be seen that they may be fitted with accuracy for the purposes intended, either by properly forming the mold, or by the necessary tooling, and when once fitted, they will not be destroyed or impaired by fluctuations in temperature to which they are exposed, as they have received a permanent "set" when treated by the method above described, which renders them practically insensible to such changes.

It is necessary only to refer to a single application of hard rubber articles to mechanical purposes to demonstrate the advantages of my method and the use of the improved article, and that is, in disk water meters, where the disk has to be accurately fitted and delicately adjusted so as to be subject to as little friction and wear as possible, in order that an accurate register may be obtained. In the use of such disks made from hard rubber as ordinarily treated, when the disk has been molded and fitted accurately in place, if there is a change in the temperature of the article, as for instance, in running hot water, the disk is found to expand in one direction and contract in another, and thereby becomes distorted, so that it does not bear evenly and smoothly on the adjacent parts, and this not only interferes with the flow of the water, but greatly interferes with the accuracy of the registration. When, however, such disks are treated by my improved method, and are once accurately fitted, it is found that they remain in that condition, having a permanent "set," and are practically insensible to all changes of temperature to which they may be subjected, and do not become distorted and thereby interfere with their accurate operation.

It will be seen that my improved method can be carried out without additional expense or time, and that articles can be molded with as great facility as in the ordinary procedure heretofore followed.

What I claim is—

1. The method of manufacturing hard rubber articles, substantially as hereinbefore set forth, which consists in first subjecting the crude compound to the combined effects of heat and pressure in a proper mold until the plastic compound assumes the form of the mold-cavity, and then wholly or partially removing the pressure while still subjected to the action of heat, and allowing it to cool under these conditions.

2. In the manufacture of hard rubber articles, the method, substantially as hereinbefore described, which consists in subjecting the compound to the combined effect of heat and pressure in a proper mold until the compound becomes plastic and assumes the form of said mold, then wholly or partially removing the pressure, allowing the plastic material to expand while subjected to heat but not pressure, and then cooling the material under these conditions, whereby it assumes a permanent "set," and is capable of withstanding variations of temperature without distortion.

In testimony whereof I have signed my name to this specification in the presence of two subscribing witnesses.

JOHN THOMSON.

Witnesses:
ROBERT S. CHAPPELL,
J. MCKINNON.